United States Patent
Stein et al.

(10) Patent No.: US 12,219,306 B2
(45) Date of Patent: Feb. 4, 2025

(54) DISTRIBUTED WITNESS INTEGRITY SENSING PLATFORM

(71) Applicant: Analog Devices, Inc., Wilmington, MA (US)

(72) Inventors: Yosef Stein, Sharon, MA (US); Seth S. Kessler, West Newton, MA (US); Hazarathaiah Malepati, Farmington, CT (US); Armindo B. Chaves, Hudson, MA (US); Michael Borgen, Wilmington, MA (US); Christopher T. Dunn, Wenham, MA (US)

(73) Assignee: ANALOG DEVICES, INC., Wilmington, MA (US)

( * ) Notice: Subject to any disclaimer, the term of this patent is extended or adjusted under 35 U.S.C. 154(b) by 572 days.

(21) Appl. No.: 17/392,565

(22) Filed: Aug. 3, 2021

(65) Prior Publication Data

US 2022/0046336 A1    Feb. 10, 2022

Related U.S. Application Data

(60) Provisional application No. 63/060,999, filed on Aug. 4, 2020.

(51) Int. Cl.
*H04Q 9/00* (2006.01)
*H02J 50/00* (2016.01)
*H02J 50/10* (2016.01)

(52) U.S. Cl.
CPC ............ *H04Q 9/00* (2013.01); *H02J 50/001* (2020.01); *H02J 50/10* (2016.02); *H04Q 2209/88* (2013.01)

(58) Field of Classification Search
CPC .................................. H02J 50/10; H04Q 9/00
See application file for complete search history.

(56) References Cited

U.S. PATENT DOCUMENTS

| 9,485,605 | B2 | 11/2016 | Beran et al. |
| 10,403,059 | B2 | 9/2019 | Moravek et al. |
| 10,486,803 | B2 | 11/2019 | Black et al. |
| 2005/0017873 | A1 | 1/2005 | Liu et al. |
| 2019/0181685 | A1* | 6/2019 | Su .................. H02J 50/001 |
| 2019/0222652 | A1 | 6/2019 | Graefe et al. |

FOREIGN PATENT DOCUMENTS

| EP | 2396971 B1 | 8/2010 |
| WO | 2014018288 A1 | 1/2014 |

OTHER PUBLICATIONS

Bibliographic Data of EP2396971, 1 page.

* cited by examiner

*Primary Examiner* — Walter L Lindsay, Jr.
*Assistant Examiner* — Andrew V Do
(74) *Attorney, Agent, or Firm* — ArentFox Schiff LLP

(57) ABSTRACT

Systems and methods are provided for a distributed mufti-sensor witness integrity sensing platform (WISP) approach which allows for positioning of sensors in an enclosed space. In particular, a WISP platform is divided into two modules, with a base module is connected to multiple edge sensor modules with a wired connection. In general, splitting up the distributed WISP system described herein allows multiple sensors to be placed in an enclosed (and generally inaccessible) location. The sensor data can be transmitted from the multiple edge sensor modules via a connection to the base module. Additionally, the use of the two module system as provided herein allows the sensors to be positioned meters away from the first module.

18 Claims, 9 Drawing Sheets

DISTRIBUTED WITNESS INTEGRITY SENSING PLATFORM

CROSS REFERENCE TO RELATED APPLICATIONS

This application is related to and claims the benefit of priority under 35 U.S.C. § 119(e) to U.S. Provisional Patent Application No. 63/060,999 entitles "Distributed Witness Integrity Sensing Platform" filed on Aug. 4, 2020, which is hereby incorporated by reference in its entirety.

FIELD OF THE DISCLOSURE

The present invention relates to a sensor system, including a wireless sensor system.

BACKGROUND

Helicopters, airplanes, rotorcraft, and other vehicle structure integrity sensing is used to detect cracks, corrosion, and other structural changes to the vehicle. Structural integrity sensing is often done in legacy devices by mounting a cluster of wireless sensors in hard-to-reach hotspot locations. In such a case, 1:1 radio frequency (RF) energy harvesting sensors may be powered from a near-by mounted RF energy exciter. In legacy devices, the RF energy exciter uses a steering mechanism, such as a mechanical or phased array steering mechanism, to turn toward and transmit a wireless signal to each one of the wireless sensors within a cluster. Each wireless sensor then converts the wireless signal to power. However, steering the RF energy exciter for powering each of multiple sensors can present difficulties. Furthermore, sensors are often positioned in hard-to-reach places, and accessing the sensors to retrieve sensor data can be problematic.

As used herein, the term "WISP" may be interpreted as an acronym that stands for "witness integrity sensing platform." In other embodiments, the term "WISP" may be an acronym that stands for "wireless integrity sensing platform" or some other appropriate definition.

SUMMARY

Systems and methods are provided for communicating with and providing power to multiple sensors positioned in an enclosed space. In particular, a multi-sensor platform is provided that includes two types of modules: a sensor signal conditioning electronics module and an external module. Each sensor signal conditioning electronics module is connected to a sensing element. The external module includes a line of sight energy harvester, such as an inductive harvester. Additionally, the external module has a communication data link to power the sensor network and to collect sensor network status information. In some examples, the communication data link is a wired link, and in other examples, the communication data link is a wireless link.

In some implementations, a wireless integrity sensing system is provided for collecting structural integrity information from multiple sensors within an enclosed space. The sensing system includes multiple sensor modules each connected to signal conditioning electronics modules. The signal conditioning electronics modules are linked together with a wired connection in a daisy-chained manner from module to module. A first signal conditioning module is connected to an external data acquisition module. The external data acquisition module includes a line-of-sight energy harvester and a wireless communication data link to power and collect the sensor network status information.

According to one aspect, a system for wireless integrity sensing includes a base module having a processor, an energy harvester configured to receive energy and provide power to the base module, a plurality of sensing elements, a plurality of edge modules, wherein each of the plurality of edge modules is coupled to a respective sensing element of the plurality of sensing elements, and a communication link connecting the base module to each of the plurality of edge modules, wherein each of the plurality of edge modules transmits a respective data signal to the base module.

According to another aspect, a system for wireless integrity sensing comprises a base module having a processor; a plurality of sensing elements; an energy harvester configured to receive energy and provide power to the base module, wherein the base module is configured to selectively power respective sensing elements of the plurality of sensing elements; a plurality of edge modules, wherein each of the plurality of edge modules is coupled to a respective sensing element of the plurality of sensing elements; and a communication link connecting the base module to each of the plurality of edge modules, wherein each of the plurality of edge modules transmits a respective data signal to the base module.

In some implementations, each edge module of the plurality of edge modules is in one of an active operational mode, a not-powered operational mode, and a powered down operational mode. In some implementations, the communication link connects the base module to each respective edge module of the plurality of edge modules in a daisy-chain. In some implementations, when the base module powers a selected sensing element of the plurality of sensing elements along the daisy-chain, the selected sensing element is in an active operational mode, a first subset of the plurality of sensing elements between the base module and the selected sensing element are in a powered-down operational mode, and a second subset of the plurality of sensing elements between the selected sensing element and an end of the daisy-chain are in a not-powered operational mode. In some implementations, the communication link is an RS485 communication link. In some implementations, the daisy-chain ends at a network terminator.

In some implementations, the base module is configured to provide power to each of the plurality of edge modules via the communication link. In some implementations, the base module is configured to provide power to one of the plurality of edge modules at a time. In some implementations, the processor in the base module performs cluster-based edge-integrity analytics on the respective data signals received from the plurality of edge modules. In some implementations, each of the plurality of edge modules comprises a sensor signal conditioning element configured to receive sensor data from a respective sensing element of the plurality of sensing elements; and an analog-to-digital converter configured to convert sensor data to a digital data signal. In some implementations, the communication link is an I2C communication link.

According to another aspect, a system for wireless integrity sensing for collecting structural integrity information from multiple sensors within an enclosed space, comprises a base module including a processor and an energy harvester; a plurality of structural integrity sensors; and a plurality of edge modules each coupled to a respective structural integrity sensor from the plurality of structural integrity sensors; and a daisy-chain communication link connecting the base module to each of the plurality of edge modules in series, wherein the communication link ends at a network terminator; wherein the base module provides power to respective edge modules of the plurality of edge modules via the daisy-chain communication link.

In some implementations, respective edge modules of the plurality of edge modules provide sensor data to the base module via the daisy-chain communication link. In some implementations, the daisy-chain communication link is an RS485 communication link. In some implementations, the energy harvester is an inductive energy harvester. In some implementations, the system includes an inductive exciter module configured to emit inductive energy, and the energy harvester receives the emitted inductive energy and converts the received emitted inductive energy to charge to power the base module and the plurality of edge modules. In some implementations, each of the structural integrity sensors of the plurality of structural integrity sensors is configured to sense at least one of cracking, corrosion, and strain.

According to another aspect, a method for witness integrity sensing comprises emitting an inductive signal from a hotspot transceiver; receiving the inductive signal at an antenna; converting the inductive signal to charge at an energy harvesting module; providing the charge to a base module; powering, from the base module, respective sensing elements of a plurality of sensing elements, wherein each sensing element of the plurality of sensing elements is connected to a respective edge module of a plurality of edge modules, and wherein the plurality of edge modules are connected to the base module via a daisy-chain configuration; and collecting sensed data from each of the plurality of sensing elements via a communication link.

In some implementations, powering respective sensing elements comprises powering a selected element of the plurality of sensing elements, wherein the selected sensing element is in an active operational mode, a first subset of the plurality of sensing elements between the base module and the selected sensing element are in a powered-down operational mode, and a second subset of the plurality of sensing elements between the selected sensing element and an end of the daisy-chain are in a not-powered operational mode. In some implementations, collecting sensed data from each of the plurality of sensing elements comprises collecting data from a selected element of the plurality of sensing elements, wherein the selected sensing element is in an active operational mode, a first subset of the plurality of sensing elements between the base module and the selected sensing element are in a powered-down operational mode, and a second subset of the plurality of sensing elements between the selected sensing element and an end of the daisy-chain are in a not-powered operational mode.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Figure 1:
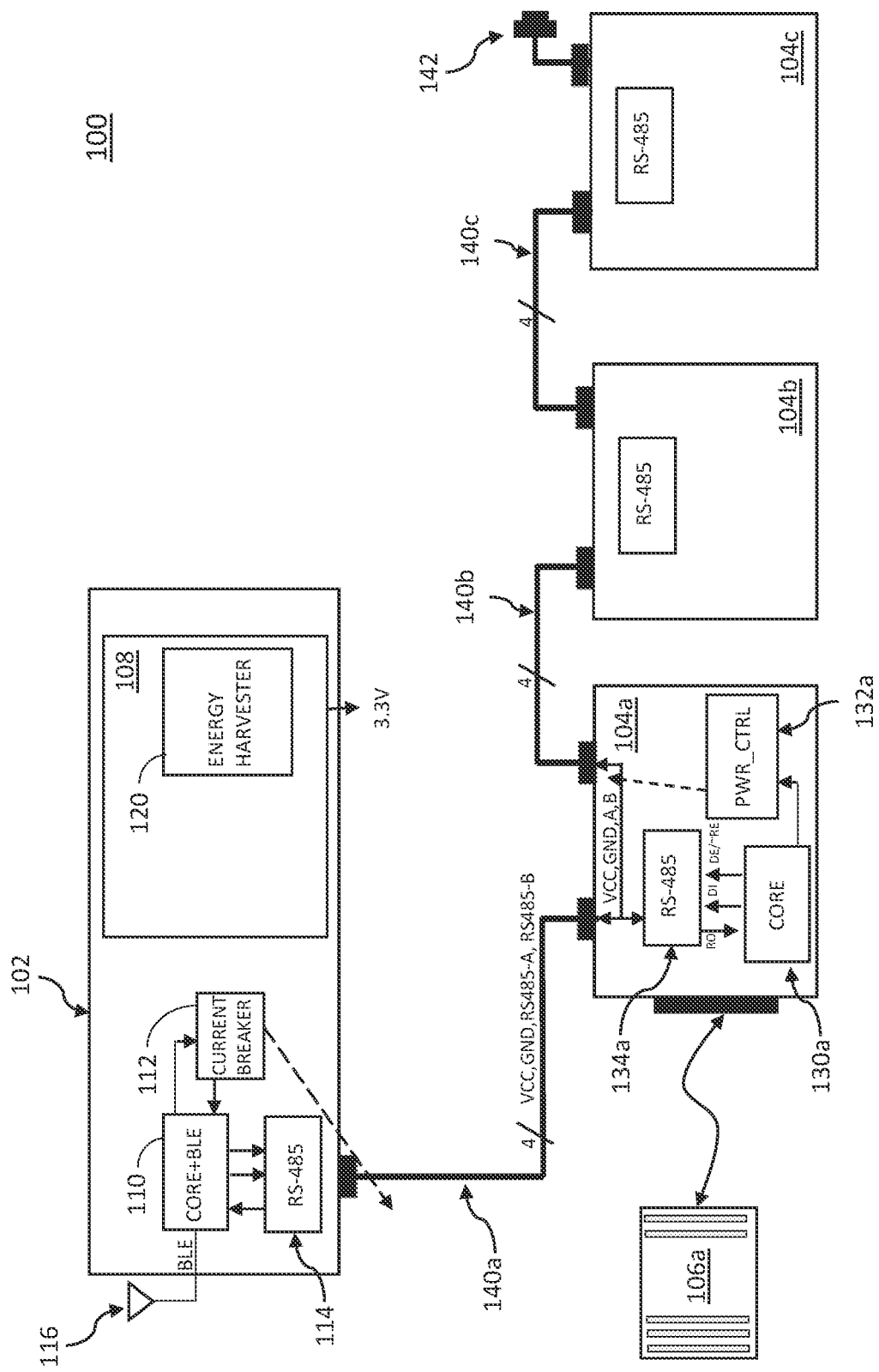
FIG. 1 depicts an example of a distributed witness integrity sensing platform (WISP) architecture including a base module connected to multiple edge modules, in accordance with embodiments of the disclosure.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

Generally, embodiments herein relate to a distributed multi-sensor witness integrity sensing platform (WISP) approach which allows for positioning of sensors in an enclosed space. In particular, a base module is positioned outside of the enclosed space, and includes a processor, a sensor interface, and a transceiver. In some examples, the base module is a wireless module and includes an energy harvester, for converting received wireless transmissions into energy. In other examples, the base module includes a wired power source. The base module is coupled to one or more edge modules, which can be positioned within the enclosed space. Each edge module is coupled to a sensing element.

In some examples, the edge modules are connected to the base module with a wired connection. In various examples, the wired connection is a RS485 connection. In particular, a first edge module is connected to the base module and also to a second edge module. The second edge module is further connected to a third edge module. Multiple edge modules can be connected in this manner, via a daisy-chain, until a network terminator is reached indicating the end of the edge module chain.

In another implementation, the base module is connected to multiple edge modules using a wired I2C connection, and each edge module includes an I2C-ADC, a sensor signal conditioning element, and a sensing element. In particular, using an I2C connection, two wires can be used to connect the base module to any number of sensors. VCC and ground are also sent across the bus to power the edge modules. I2C (or inter-integrated circuit bus) is a communication protocol having two wires, including a serial data line for sending and receiving data between a master and slave.

According to various implementations, splitting up the WISP system into two modules (a base module and an edge module) and connecting the two modules using a wired connection (such as RS485 or I2C) allows multiple sensors to be placed in an enclosed (and generally inaccessible) location. The senor data can be transmitted via the wired connection to the base module. Additionally, the use of the two module system with wired connection, as provided herein, allows the sensors to be positioned many meters away from the base module. In various examples, the sensors can be positioned five, ten, fifteen, twenty, fifty, one hundred, two hundred, three hundred, four hundred, five hundred, or more than five hundred meters away from the base module.

In contrast, in a single-module system with the one module connected to multiple sensors, the sensors can only be about a meter or two meters from the module, because the longer the wires, the more the signal becomes distorted by the resistance inherent in the connection. Placing the single module closer to the desired location of the sensors can make it extremely difficult, if not impossible, to provide power or charge to the module when the desired location is in a generally inaccessible location.

In various implementations, the distributed WISP architectures described herein can be used in many different types of locations. For example, the distributed WISP architecture can be used in a vehicle (e.g., a helicopter, a rotorcraft, an airplane, a ship, a tank, a truck, a car, etc.). In other examples, the distributed WISP is used in a non-vehicular environment such as a building or some other structure.

FIG. 1 shows a distributed witness integrity sensing platform (WISP) architecture 100 including a base module 102 connected to multiple edge modules 104a, 104b, 104c, according to various embodiments of the disclosure. In particular, the base module 102 is connected to a first edge module 104a via a first wired connection 140a. The first wired connection 140a transmits power from the base module 102 to the first edge module 104a, and the first wired connection 140a transmits data from the first edge module 104a to the base module 102.

The base module 102 includes a power management unit 108 having an energy harvester 120 and energy storage, a processor 110, a base communication component 114, a current breaker 112, and an antenna 116. The first module 102 receives power at the energy harvester 120.

In some examples, the energy harvester 120 includes an antenna and receives the signals from a hotspot mounted transceiver. In some examples, the wireless signals received at the energy harvesting antenna include inductive energy, and in other examples, the signals received at the energy harvesting antenna include radiofrequency energy. In some examples, inductive harvested energy is between about 30 mW and 330 mW. In other examples, the wireless signals are radiofrequency signals and may be in accordance with an ISM RF band and/or a RFID protocol. The energy harvester 120 transmits the harvested energy to storage, where it is accessed by other elements of the base module 102. Additionally, the energy harvested by the energy harvester 120 is transmitted to the edge modules 104a, 104b, 104c and provides power to the edge modules 104a, 104b, 104c. In some examples, the power management unit 108 provides between about 10 mA to 100 mA of current. In some examples, the power management unit 108 provides about 3.3 V of voltage.

The power management unit 108 manages the extracted power. The energy storage element and power management unit 108 include one or more circuit elements, which can be active or passive. In some examples, the charge storage element includes multiple capacitors. In some examples, the charge storage element includes one or more batteries. In some implementations, the power management unit receives a DC signal as input. The power management unit 108 outputs power to the processor unit 110 and transceiver, as well as to the output line 140a. The power management unit 108 retrieves energy from the energy storage element to provide power to other WISP elements.

The power management unit 108 is coupled to the core element 110, which includes a processor and a transceiver. The processor can include a printed circuit board, and the printed circuit board can be a digital printed circuit board. The printed circuit board can include active and passive circuit elements. In some examples, the transceiver is coupled to an antenna 116. In some examples, the transceiver is a Bluetooth low energy (BLE) transceiver. In various examples, the processor is a single or multi-core processor, an M4-core processor, or some other type of processor.

According to various implementations, the processor of the core element 110 is configured to perform cluster-based edge-integrity analytics. Specifically, the processor is configured to receive digitized sensed data from the various edge modules 104a-104c via the communication line 140 (including lines 140a, 140b, 140c), as described in greater detail below. In some examples, the processor performs cluster-based edge integrity analytics on the received data, and transmits the results of the analytics via the transceiver. In some examples, the processor receives the digitized sensed data and transmits the data. In particular, the transceiver is coupled to an antenna 116 which can send one or more wireless signals to a hotspot mounted reader/transceiver. For example, the antenna can send one or more Bluetooth signals or other wireless signals in accordance with a protocol and thereby provide a wireless data signal to a hotspot mounted reader.

The core element 110 is coupled to a current breaker 112, which is configured to provide instructions to the edge modules 104a-104c including which edge module(s) 104a-104c to provide power to. In some examples, only one edge module 104a-104c is actively powered on at a time. If, for example the first edge module 104a is powered on, no power is transmitted from the first edge module 104a to the second 104b or third 104c edge modules, and power transmission ends at the first edge module 104a. If the second edge module 104b is powered on, power is transmitted through the first wired connection 140a, through the first edge module 104a to the second wired connection 140b to the second edge module 104b. The first edge module 104a is not powered on, but energy is passed through it to the second edge module 104b, which the third edge module 104c is completely off. In some examples, when power passes through the first edge module 104a, the edge module is in a sleep mode. The network terminator 142 indicates the end of the chain of edge modules.

As shown in FIG. 1, the first wired connection 140a continues through the first edge module 104a to the second wired connection 140b to the second edge module 104b. The second wired connection 140b continues through the second edge module 104b to the third wired connection 140c to the third edge module 104c. The third wired connection 140c continues through the third edge module 104c to the network terminator 142. Thus, a wired connection 140 including first 140a, second 140b, and third 140c wired connections connects the base module 102 to the first 104a, second 104b, and third 104c edge modules in a daisy-chain fashion.

Through the wired connection 140, the base module 102 provides power to each of the first 104a, second 104b, and third 104c edge modules. Similarly, through the wired connection 140, the first 104a, second 104b, and third 104c edge modules transmit data (e.g., sensor data) to the base module 102. In some examples, the wires connection 140 induces a VCC line, and ground line, a RS485-A line, and a RS485-B line.

Each edge module 104a, 104b, 104c includes a core processor 130a, a power control component 132a, and a communication element 134a. Additionally, each edge module 104a, 104b, 104c is connected to a sensor element such as the first sensor element 106a connected to the first edge module 104a. In various examples, the sensor elements are designed to generate sensed data related to corrosion, cracks, torque, strain, strain gauge, or some other parameter of a device on which the sensors are located.

Referring to the first edge module 104a, the core processor 130a receives data from the sensor element 106a. In various implementations, the core processor is configured to perform cluster-based edge-integrity analytics. In particular, the processor is configured to receive sensed data from the first sensor element 106a. In some examples, the processor performs cluster-based edge integrity analytics on the received data, and transmits the results of the analytics to the base module 102 via the communication link 140a. In some examples, the processor receives the sensed data from the first sensor element 106a and transmits the data to the base module 102 via the communication link 140a.

The communication element 134a is coupled to the first communication line 140a and includes a receiver pin (RO), a driver pin (DI), a receiver enable pin (RE), and a driver enable pin (DE). The communication element 134a receives the power input over the communication element 134a, which powers the first edge module 104a. When data is being transmitted from the core processor 130a to the base module 102, the driver enable pin is enabled. When power is being received from the base module 102, the receive enable pin is enabled. In some implementations, The power control component 132a is couplet to the core processor 130a. In various implementations, the power control component 132a switches off the power from the first edge module 104a to the second edge module 104b, which also prevents transmission of power to the third edge module 104c and any other modules further down the daisy chain. In some examples, the core processor 130a provides instructions to the power control component 132a

The power management unit and the energy storage element are coupled to the core element, which includes a processor and a transceiver. The processor can include a printed circuit board, and the printed circuit board can be a digital printed circuit board. The printed circuit board can include active and passive circuit elements. In some examples, the transceiver is coupled to an antenna. In some examples, the transceiver is a Bluetooth low energy (BLE) transceiver. In various examples, the processor is a single or multi-core processor, an M4-core processor, or some other type of processor.

Figure 2:
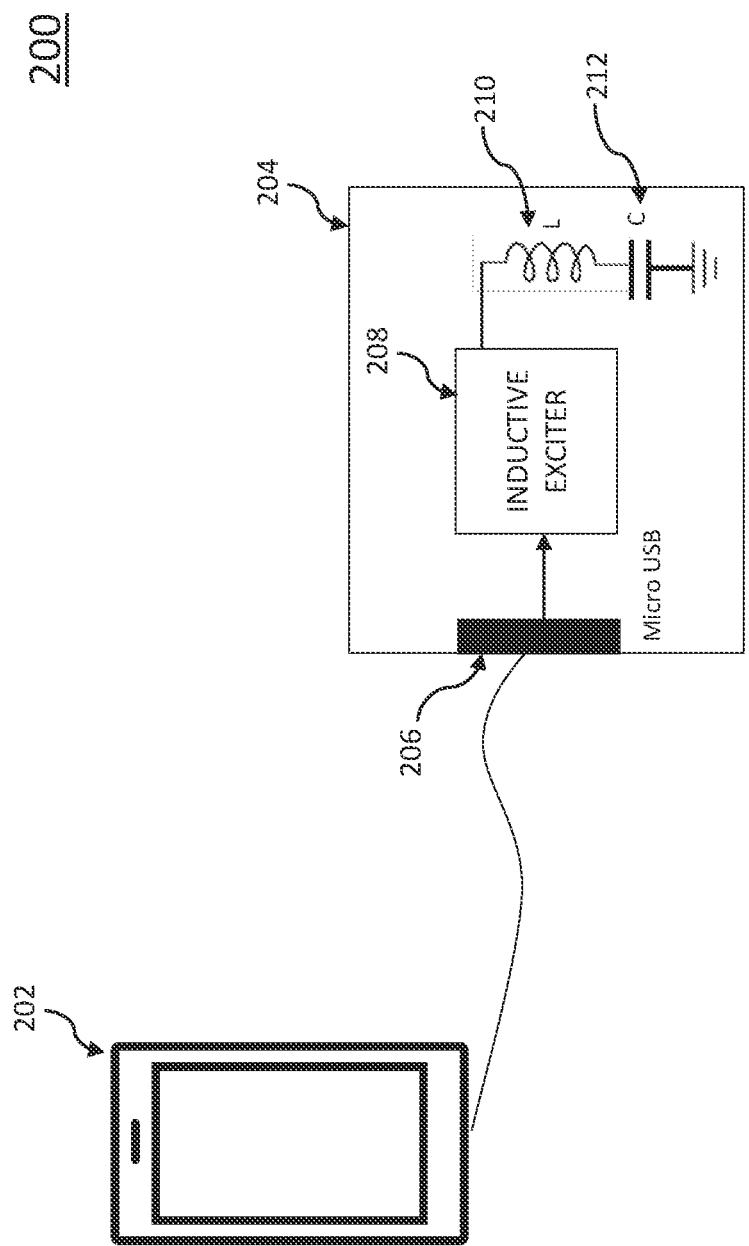
FIG. 2 is a diagram illustrating an exemplary inductive exciter module for charging a WISP device, according to various embodiments of the disclosure.

FIG. 2 is a diagram illustrating an exemplary inductive exciter module 204 for charging a WISP device, according to various embodiments of the disclosure. As shown in FIG. 2, the inductive exciter module 204 can draw power from a mobile device 202. In one example, the inductive exciter module 204 is connected to the mobile device 202 via a micro USB connection 206 and draws about 0.5 Amperes at about 5 Volts. In other examples, the inductive exciter module 204 draws power from another source such as a battery pack or outlet. The inductive exciter module 204 includes an inductive exciter 208, which emits inductive energy that can be received by an energy harvester of a WISP device, such as the energy harvester 120 shown in FIG. 1. The inductive exciter 208 is coupled to an inductor 210, which is coupled to a capacitor 212. The other side of the capacitor 212 is connected to ground.

Figure 3:
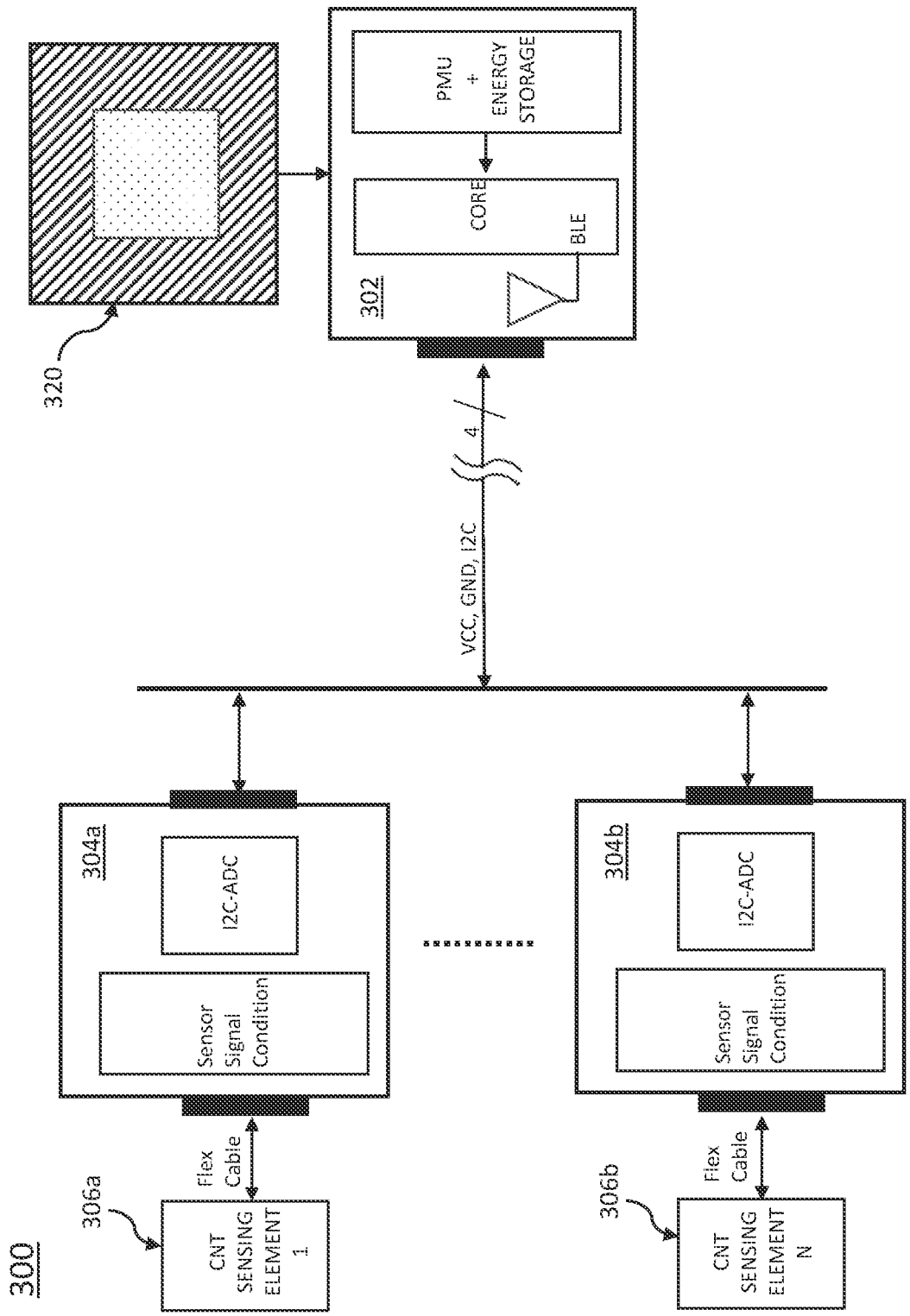
FIG. 3 depicts another example of a distributed witness integrity sensing platform (WISP) architecture including a base module connected to multiple second modules, in accordance with embodiments of the disclosure.

FIG. 3 shows a distributed witness integrity sensing platform (WISP) architecture 300 including a base module 302 connected to multiple edge modules 304a, 304b, according to various embodiments of the disclosure. The base module 302 includes energy storage and a power management unit, a processor, and a transceiver. The base module 302 receives power from an energy harvesting antenna 320. The multiple edge modules 304a, 304b each include an I2C-ADC and a sensor signal conditioning unit, and are connected to a sensor. The multiple edge modules 304a, 304b are connected to the base module 302 with an I2C connection.

The energy harvesting antenna 320 is configured to receive one or more wireless signals. In some examples, the energy harvesting antenna 320 receives the signals from a hotspot mounted transceiver. In some examples, the wireless signals received at the energy harvesting antenna 320 include radiofrequency energy. The wireless signals may be in accordance with an ISM RF band and/or a RFID protocol.

The base module 302 includes energy storage and a power management unit, a processor, and a transceiver. The signals received at the energy harvesting antenna 320 are converted energy, which can be stored in the energy storage element in the base module 302. In some examples, the energy can be used to power the base module 302 and the edge modules 304a, 304b, as well as the sensor elements 306a, 306b. The power management unit manages the extracted power. The energy storage element and power management include one or more circuit elements, which can be active or passive. In some examples, the charge storage element includes multiple capacitors. In some examples, the charge storage element includes one or more batteries. In some implementations, the power management unit receives a DC signal as input. The power management unit outputs power to the processor unit and transceiver, as well as to the I2C output line. The power management unit can retrieve energy from the energy storage element to provide power to other WISP elements.

The power management unit and the energy storage element are coupled to the core element, which includes a processor and a transceiver. The processor can include a printed circuit board, and the printed circuit board can be a digital printed circuit board. The printed circuit board can include active and passive circuit elements. In some examples, the transceiver is coupled to an antenna. In some examples, the transceiver is a Bluetooth low energy (BLE) transceiver. In various examples, the processor is a single or multi-core processor, an M4-core processor, or some other type of processor.

According to various implementations, the processor is configured to perform cluster-based edge-integrity analytics. Specifically, the processor is configured to receive digitized sensed data from the various edge modules 304a-304b via the I2C communication line, as described in greater detail below. In some examples, the processor performs cluster-based edge integrity analytics on the received data, and transmits the results of the analytics via the transceiver. In some examples, the processor receives the digitized sensed data and transmits the data. In particular, the transceiver is coupled to an antenna which can send one or more wireless signals to a hotspot mounted reader/transceiver. For example, the antenna can send one or more Bluetooth signals or other wireless signals in accordance with a protocol and thereby provide a wireless data signal to a hotspot mounted reader.

The base module 302 is connected to multiple edge modules 304a, 304b via an I2C communication link. In particular, the base module receives data from multiple edge modules 304a, 304b via a serial data line in the I2C communication link. Although only two edge modules 304a, 304b are shown, it is understood that the distributed WISP architecture can include many edge module. In various examples, a distributed WISP architecture includes five edge modules, eight edge modules, ten edge modules, twelve edge modules, fifteen edge modules, eighteen edge modules, twenty edge modules, or more than twenty edge modules.

The edge modules 304a, 304b each include an I2C analog-to-digital converter (I2C-ADC) and a sensor signal conditioning element. Each edge module 304a, 304b is connected to a respective sensor 306a, 306b. Sensor data is received at the edge module. In some examples, the sensor signal conditioning element receives sensor data. The sensor signal conditioning elements include one or more resistors and filter sensor output to remove sensor noise, etc. The I2C-ADC converts the filtered analog sensor data from the sensor signal conditioning elements to digital sensed data. The digital sensed data is transmitted to the base module 302 via the I2C communication link.

In various implementations, the sensors are configured to generate sensed data related to corrosion, cracks, torque, strain, strain gauge, or some other parameter of a device on which the sensors are located. In one example, the sensors are positioned in the hull of a helicopter. In another example, the sensors are positioned on the wing of an aircraft. In various examples, the sensors are positioned in a vehicle and designed to sense a parameter related to the structure and/or the structural integrity of the vehicle. In some examples, the sensors are called sensing elements. The sensors can also be used for flight simulations.

In some implementations, a mix of witness integrity sensing elements are used by the distributed WISP architecture to perform hotspot integrity analytics.

Figure 4:
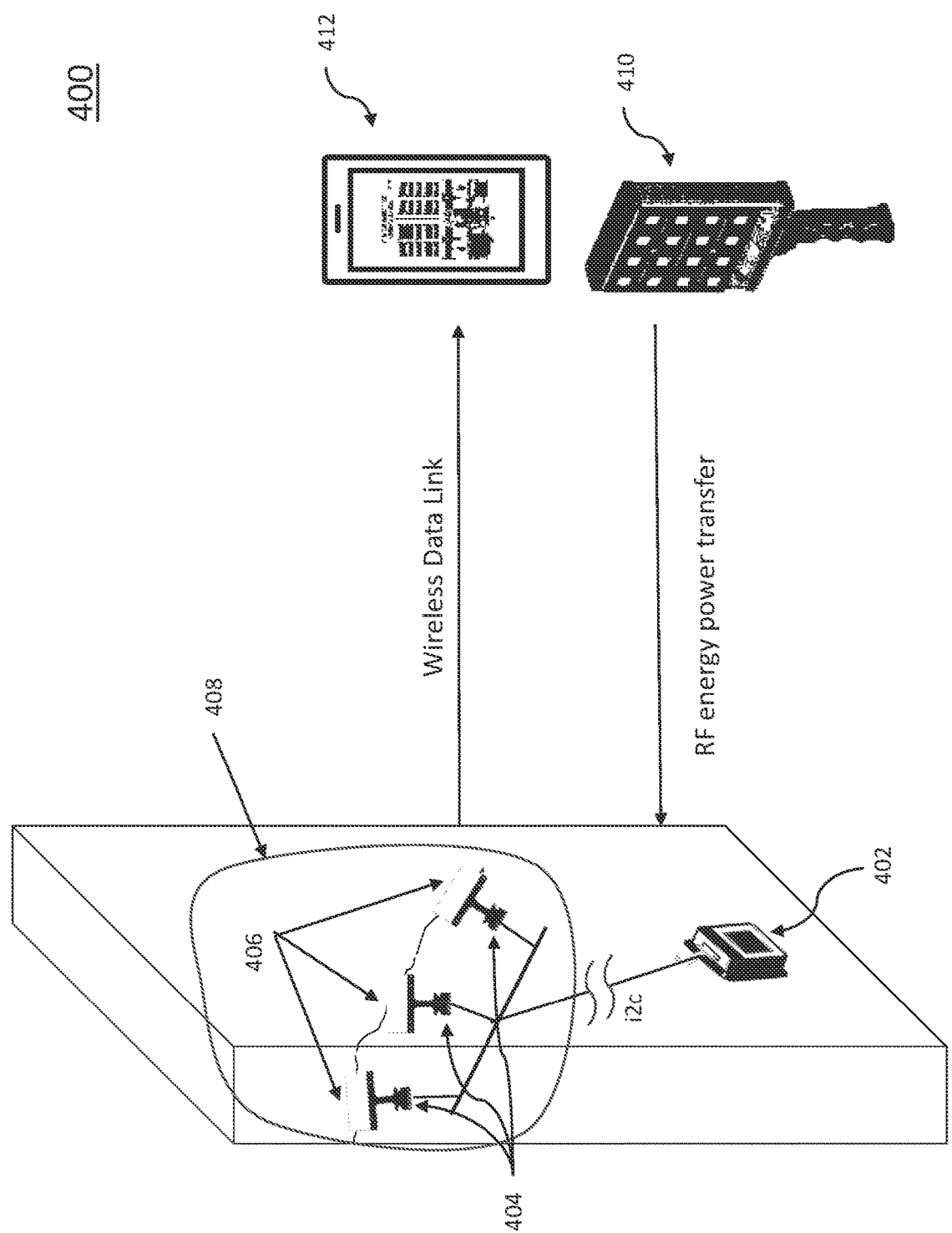
FIG. 4 illustrates an example of a distributed WISP architecture, an exciter, and a reader, in accordance with various embodiments of the disclosure.

FIG. 4 shows a distributed WISP architecture 400 including an exciter 410, and a reader 412, according to various embodiments. The distributed WISP architecture 400 is shown on the left, including a cluster of sensors 406 and edge modules 404 in an enclosed space 408, connected to a base module 402 via an I2C communication link. The exciter 410 and reader 412 communicate wirelessly with the base module 402. In particular, the exciter 410 can be a hotspot transmitter that transmits wireless signals to the energy harvesting antenna of the base module 402. In some implementations, the hotspot transmitter transmits radiofrequency energy signals to the energy harvesting antenna. In various examples, the hotspot transmitter has a non-steerable energy transmitter, and the hotspot transmitter emits a point-to-point radiofrequency signal to the energy harvesting antenna. The hotspot transmitter includes an antenna which can be, for example, a gain antenna. In some implementations, the hotspot transmitter is an inductive transmitter. In some implementations, the hotspot transmitter wirelessly transmits radiofrequency signals in accordance with a RF identification (RFID) protocol. In some examples, the wireless signals are RF signals in accordance with a worldwide (WW) industrial, scientific, and medical (ISM) RF band. In various examples, the ISM RF band is in the range of 5.725-5.875 gigahertz (GHz), 2.4-2.5 GHz, or some other worldwide RF band range.

The reader 412 receives data from the base module 402. For example, the reader 412 receives wireless data transmitted from the antenna coupled to the processor in the base module. In some examples, the wireless data is transmitted using a BLE link. In various examples, the reader 412 is a computing device, a computer, a tablet, and/or a smart phone.

Figure 5:
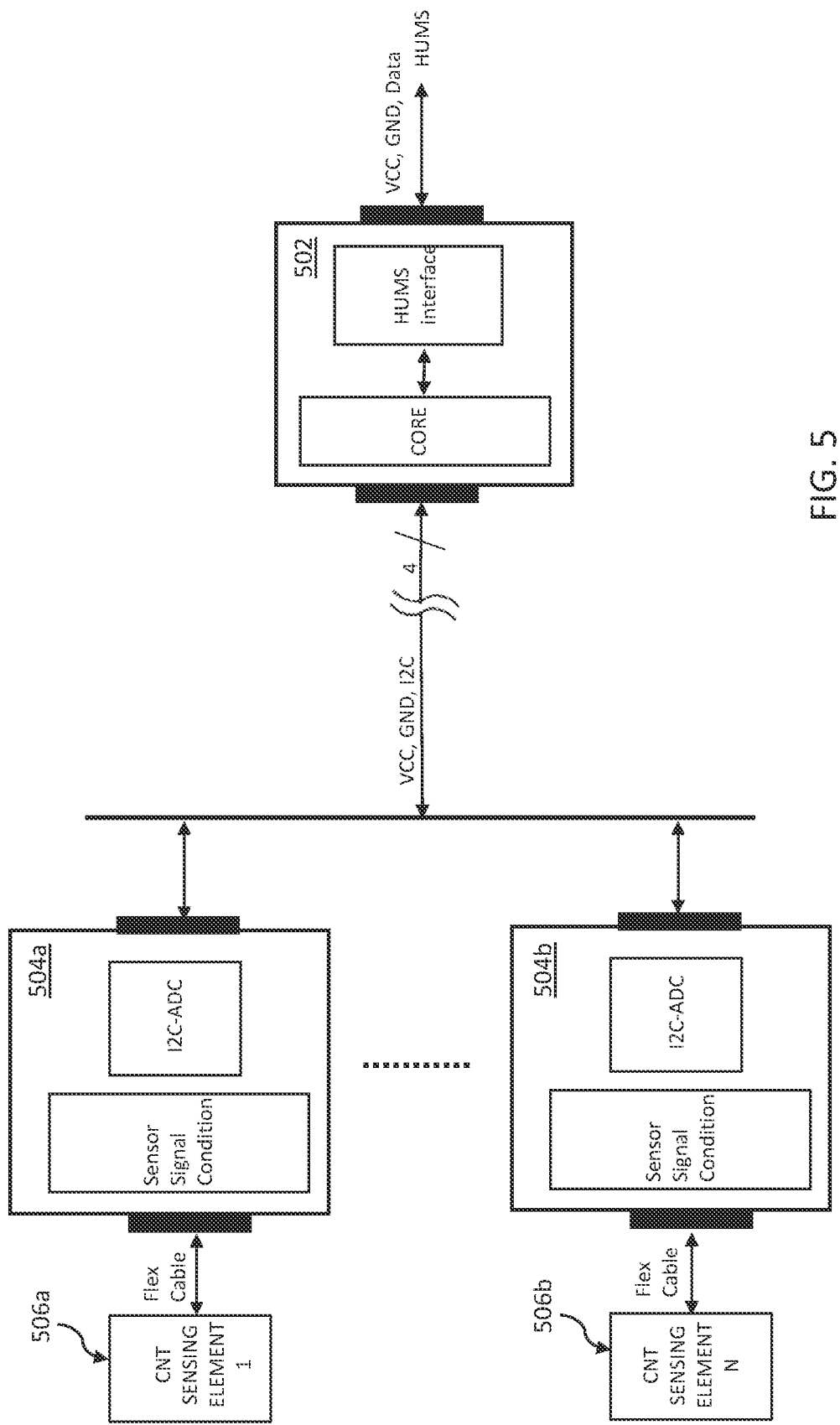
FIG. 5 is diagram illustrating a distributed WISP architecture coupled to a HUMS device, in accordance with various embodiments of the disclosure.

FIG. 5 shows a distributed WISP architecture 500 coupled to a HUMS device, according to various embodiments. A HUMS device is a Health and Usage Monitoring device, and is often used in helicopters and other vehicles. The HUMS device is coupled to the base module 502 of the distributed WISP architecture 500, and provides power to the base module 502. The HUMS device also receives communications from the base module 502. The base module 502 includes a HUMS interface and a core element including a processor. The HUMS interface in the base module 502 receives energy from the HUMS device and uses the energy to power the base module, and to provide energy to multiple edge modules 504a, 504b.

In some examples, as described above with respect to FIG. 1, the multiple edge modules 504a, 504b are coupled to the base module via a RS485 connection. In other examples, as described above with respect to FIG. 3, the multiple edge modules 504a, 504b are coupled to the base module via an I2C connection. The function of the edge modules 504a, 504b is the same as the function of the edge modules 304a, 304b of FIG. 3. The edge modules 504a, 504b receive sensed data from sensors 506a, 506b, filter the data, and convert the data to a digital signal, and transmit the digital data back to the base module 502 via the communication link. In some examples, the edge modules 504a, 504b are connected to the base module 502 via a RS485 communication link, as described above with respect to FIG. 1, and the edge modules 504a, 504b transmit data back to the base module 502 via the RS485 communication link. The processor in the base module 502 processes the data, and transmits the processed data to the HUMS device via a wired connection. In some examples, the processor in the base module 502 performs cluster-based edge-integrity analytics on the digital data from the edge modules 504a, 504b.

Figure 6:
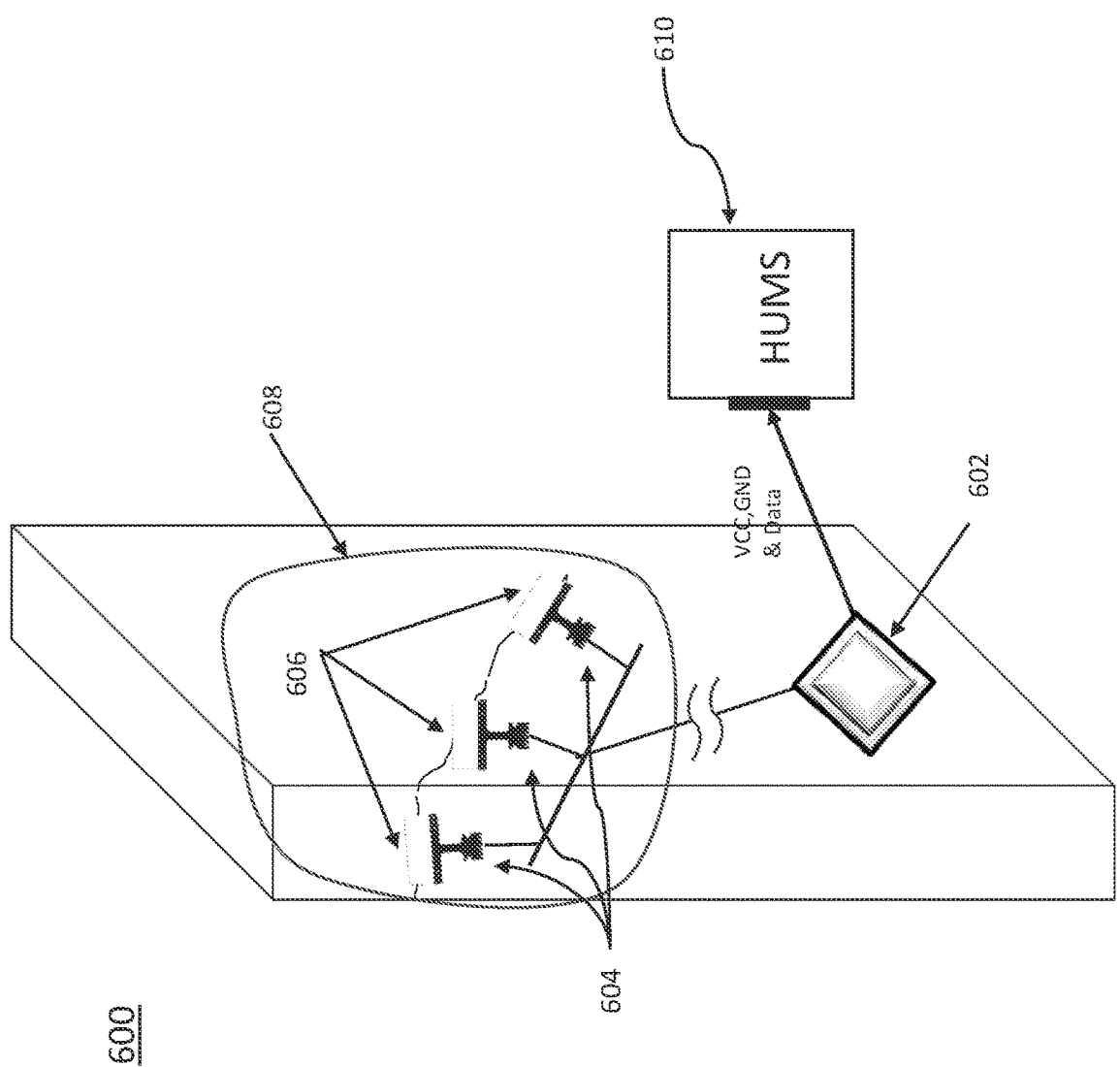
FIG. 6 is a diagram illustrating distributed WISP architecture in an enclosed space, in accordance with various embodiments of the disclosure.

FIG. 6 shows the distributed WISP architecture 600 described in FIG. 5 with the sensors 606 and edge modules 604 installed in an enclosed space 608, according to various embodiments. The edge modules 604 are connected to a base module 602 via a wired communication link. In some examples, the communication link is a RS485 communication link. In some examples, the communication link is an i2C communication link. The base module 602 includes a HUMS interface and a core element including a processor. The HUMS interface in the base module 602 receives energy from the HUMS device and uses the energy to power the base module, and to provide energy to the edge modules 604a, 604b. The HUMS device also receives communications from the base module 602.

Figure 7:
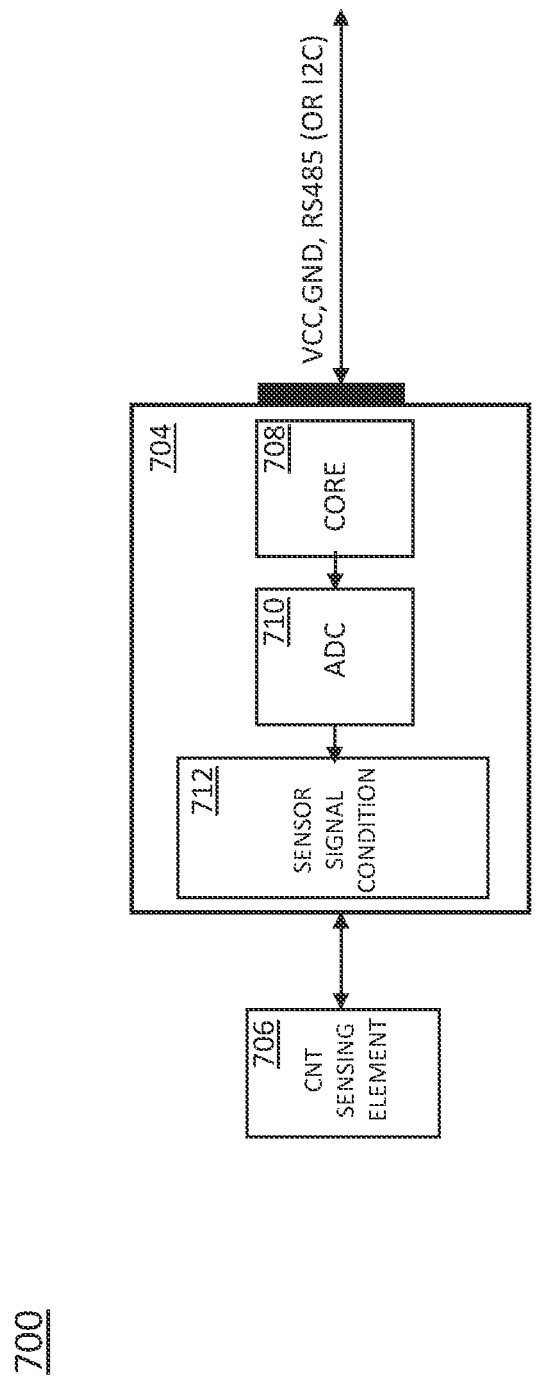
FIG. 7 is a diagram illustrating a second module and a sensor element, in accordance with various embodiments of the disclosure.

FIG. 7 shows an architecture 700 having edge module 704 and a sensor element 706, according to various embodiments. The edge module 706 shown in FIG. 7 includes a core processor 708, an analog-to-digital converter (ADC) 710, and a sensor signal conditioning element 712. The edge module 704 is connected to a sensor 706. Sensor data is received at the edge module 704. In some examples, the sensor signal conditioning element 712 receives sensor data. The sensor signal conditioning element 712 includes one or more resistors and filters sensor 706 output to remove sensor noise. The ADC 710 converts the filtered analog sensor data from the sensor signal conditioning element 712 to digital sensed data. The processor 708 processes the digital sensed data. The processed digital sensed data is transmitted to a base module via a communication link. In some examples, the communication link is an RS485 communication link. In some examples, the communication link is an i2C communication link.

Figure 8:
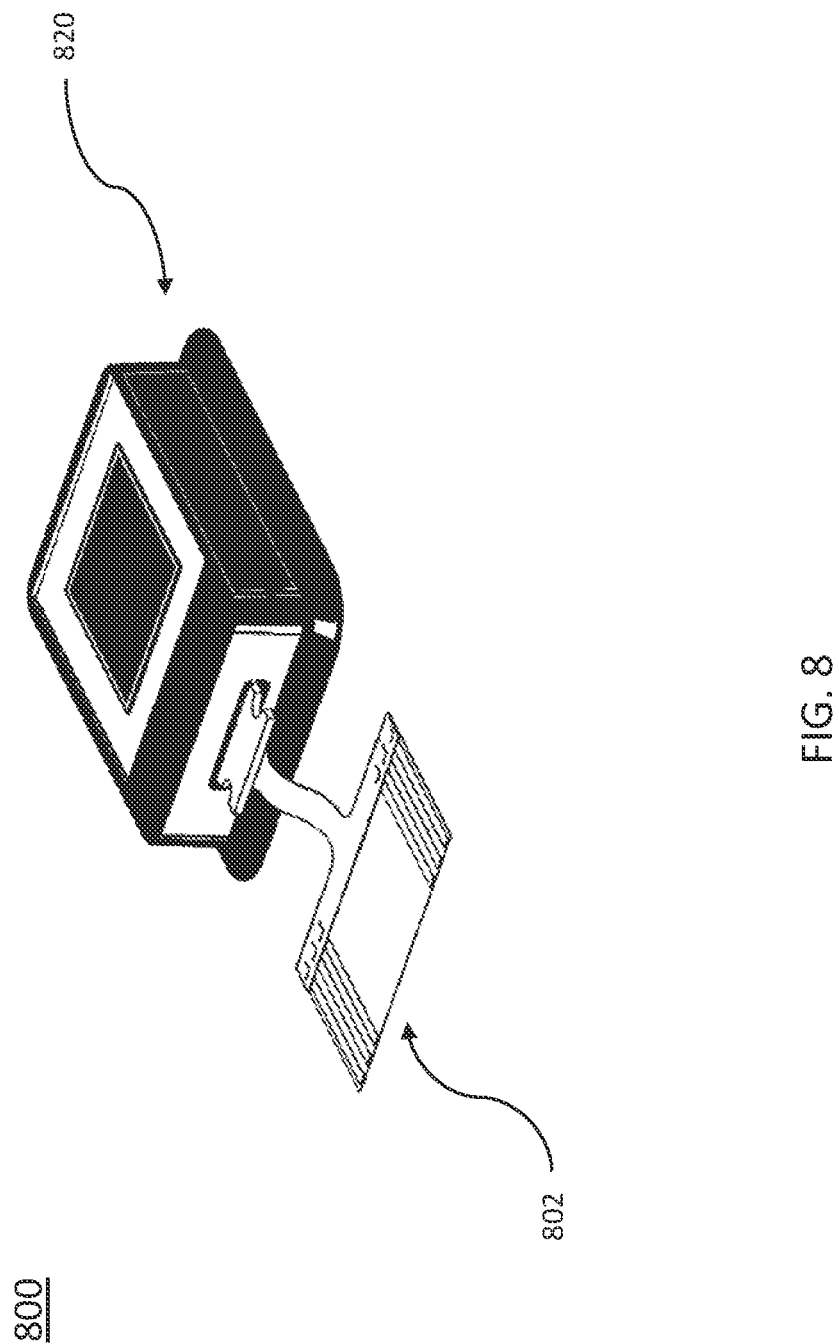
FIG. 8 shows an energy harvesting antenna coupled to a first module, in accordance with various embodiments of the disclosure.

FIG. 8 shows an example 800 of an energy harvesting antenna 820 coupled to a base module 802, according to various embodiments of the disclosure. The energy harvesting antenna 820 receives energy wirelessly from a remote wireless energy transmitter. In some examples, the energy harvesting antenna 820 is an inductive energy harvesting antenna. The energy harvested by the energy harvesting antenna 820 can be stored in an energy storage module such as a battery or a set of capacitors. In some examples, the energy storage module is in the base module 802. In some examples, the energy storage module is coupled to the energy harvesting antenna 820.

Figure 9:
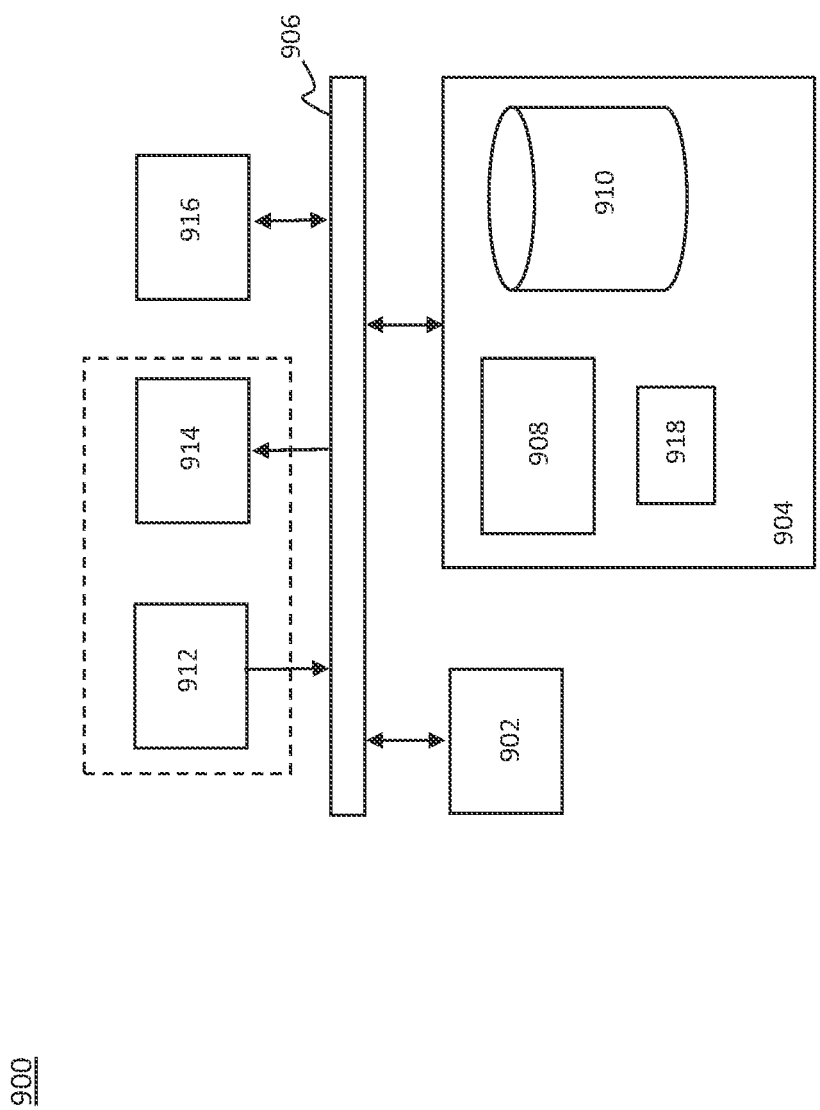
FIG. 9 depicts a block diagram illustrating an exemplary computing system that may be used for multi-sensor witness integrity sensing, according to some embodiments of the disclosure.

FIG. 9 depicts a block diagram illustrating an exemplary computing system that can be used for multi-sensor witness integrity sensing, according to some embodiments of the disclosure. As shown in FIG. 9, the data processing system 900 may include at least one processor 902 coupled to memory elements 904 through a system bus 906. As such, the data processing system may store program code within memory elements 904. Further, the processor 902 may execute the program code accessed from the memory elements 904 via a system bus 906. In one aspect, the data processing system may be implemented as a computer that is suitable for storing and/or executing program code. It should be appreciated, however, that the data processing system 900 may be implemented in the form of any system including a processor and a memory that is capable of performing the functions described within this specification.

The memory elements 904 may include one or more physical memory devices such as, for example, local memory 908 and one or more bulk storage devices 910. The local memory may refer to random access memory or other non-persistent memory device(s) generally used during actual execution of the program code. A bulk storage device may be implemented as a hard drive or other persistent data storage device. The processing system 900 may a so include one or more cache memories (not shown) that provide temporary storage of at least some program code in order to reduce the number of times program code must be retrieved from the bulk storage device 910 during execution.

Input/output (I/O) devices depicted as an input device 912 and an output device 914 optionally can be coupled to the data processing system. In some examples herein, an input/output device is coupled to a hotspot transceiver. In some examples, input/output devices can be wireless coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 912 and the output device 914). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 916 may also be coupled to the data processing system to enable it to become coupled to other systems, computer systems, remote network devices, and/or remote storage devices through intervening private or public networks. The network adapter 916 may comprise a data receiver for receiving data that is transmitted by said systems, devices and/or networks to the data processing system 900, and a data transmitter for transmitting data from the data processing system 900 to said systems, devices and/or networks. Modems, cable modems, and Ethernet cards are examples of different types of network adapter that may be used with the data processing system 900.

As pictured in FIG. 9, the memory elements 904 may store an application 918. In various embodiments, the application 918 may be stored in the local memory 908, the one or more bulk storage devices 910, or apart from the local memory and the bulk storage devices. In some examples, the application 918 can include an application for cluster-based integrity analytics. It should be appreciated that the data processing system 900 may further execute an operating system (not shown in FIG. 9) that can facilitate execution of the application 918. The application 918, being implemented in the form of executable program code, can be executed by the data processing system 900, e.g., by the processor 902. Responsive to executing the application, the data processing system 900 may be configured to perform one or more operations or method steps described herein.

In another aspect, the data processing system 900 may represent a client data processing system. In that case, the application 918 may represent a client application that, when executed, configures the data processing system 900 to perform the various functions described herein with reference to a "client". Examples of a client can include, but are not limited to, a personal computer, a portable computer, a mobile phone, or the like.

Persons skilled in the art will recognize that while the elements 902-918 are shown in FIG. 9 as separate elements, in other embodiments their functionality could be implemented in lesser number of individual elements or distributed over a larger number of components.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be container on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 902 described herein.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present disclosure.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

Note that the activities discussed above with reference to the FIGURES which are applicable to any integrated circuit that involves signal processing (for example, gesture signal processing, video signal processing, audio signal processing, analog-to-digital conversion, digital-to-analog conversion), particularly those that can execute specialized software programs or algorithms, some of which may be associated with processing digitized real-time data.

In some cases, the teachings of the present disclosure may be encoded into one or more tangible, non-transitory computer-readable mediums having stored thereon executable instructions that, when executed, instruct a programmable device (such as a processor or DSP) to perform the methods or functions disclosed herein. In cases where the teachings herein are embodied at least partly in a hardware device (such as an ASIC, IP block, or SoC), a non-transitory medium could include a hardware device hardware-programmed with logic to perform the methods or functions disclosed herein. The teachings could also be practiced in the form of Register Transfer Level (RTL) or other hardware description language such as VHDL or Verilog, which can be used to program a fabrication process to produce the hardware elements disclosed.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, processors may store information in any suitable type of non-transitory storage medium (for example, random access memory (RAM), read only memory (ROM), FPGA, EPROM, electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe.

Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a persona digital assistant (PDA), a smart phone, a mobile phone, an iPad, or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Computer program logic implementing all or part of the functionality described herein is embodied in various forms, including, but in no way limited to, a source code form, a computer executable form, a hardware description form, and various intermediate forms (for example, mask works, or forms generated by an assembler, compiler, linker, or locator). In an example, source code includes a series of computer program instructions implemented in various programming languages, such as an object code, an assembly language, or a high-level language such as OpenCL, RTL, Verilog, VHDL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In some embodiments, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc.

Other components such as external storage, additional sensors, controllers for audio/video display, and peripheral devices may be attached to the board as plug-in cards, via cables, or integrated into the board itself. In another example embodiment, the electrical circuits of the FIGURES may be implemented as standalone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this disclosure.

In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Interpretation of Terms

All definitions, as defined and used herein, should be understood to control over dictionary definitions, definitions in documents incorporated by reference, and/or ordinary meanings of the defined terms. Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined.

Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke 35 U.S.C. § 112(f) as it exists on the date of the filing hereof unless the words "means for" or "steps for" are specifically used in the particular claims; and (b) does not intend, by any statement in the disclosure, to limit this disclosure in any way that is not otherwise reflected in the appended claims.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

SELECT EXAMPLES

Example 1 provides system for wireless integrity sensing, comprising a base module having a processor; a plurality of sensing elements; an energy harvester configured to receive energy and provide power to the base module, wherein the base module is configured to selectively power respective sensing elements of the plurality of sensing elements; a plurality of edge modules, wherein each of the plurality of edge modules is coupled to a respective sensing element of the plurality of sensing elements; and a communication link connecting the base module to each of the plurality of edge modules, wherein each of the plurality of edge modules transmits a respective data signal to the base module.

Example 2 provides a system according to one or more of the preceding and/or following examples, wherein each edge module of the plurality of edge modules is in one of an active operational mode, a not-powered operational mode, and a powered down operational mode.

Example 3 provides a system according to one or more of the preceding and/or following examples, wherein the communication link connects the base module to each respective edge module of the plurality of edge modules in a daisy-chain.

Example 4 provides a system according to one or more of the preceding and/or following examples, wherein when the base module powers a selected sensing element of the plurality of sensing elements along the daisy-chain, the selected sensing element is in an active operational mode, a first subset of the plurality of sensing elements between the base module and the selected sensing element are in a powered-down operational mode, and a second subset of the plurality of sensing elements between the selected sensing element and an end of the daisy-chain are in a not-powered operational mode.

Example 5 provides a system according to one or more of the preceding and/or following examples, wherein the communication link is an RS485 communication link.

Example 6 provides a system according to one or more of the preceding and/or following examples, wherein the daisy-chain ends at a network terminator.

Example 7 provides a system according to one or more of the preceding and/or following examples, wherein the base module is configured to provide power to each of the plurality of edge modules via the communication link.

Example 8 provides a system according to one or more of the preceding and/or following examples, wherein the base module is configured to provide power to one of the plurality of edge modules at a time.

Example 9 provides a system according to one or more of the preceding and/or following examples, wherein the processor in the base module performs cluster-based edge-integrity analytics on the respective data signals receives from the plurality of edge modules.

Example 10 provides a system according to one or more of the preceding and/or following examples, wherein each of the plurality of edge modules comprises a sensor signal conditioning element configured to receive sensor data from a respective sensing element of the plurality of sensing elements; and an analog-to-digital converter configured to convert sensor data to a digital data signal.

Example 11 provides a system according to one or more of the preceding and/or following examples, wherein the communication link is an I2C communication link.

Example 12 provides a system for wireless integrity sensing for collecting structural integrity information from multiple sensors within an enclosed space, comprising: base module including a processor and an energy harvester; a plurality of structural integrity sensors; and a plurality of edge modules each couples to a respective structure integrity sensor from the plurality of structural integrity sensors; and a daisy-chain communication link connecting the base module to each of the plurality of edge modules in series, wherein the communication link ends at a network terminator; wherein the base module provides power to respective edge modules of the plurality of edge modules via the daisy-chain communication link.

Example 13 provides a system according to one or more of the preceding and/or following examples, wherein respective edge modules of the plurality of edge modules provide sensor data to the base module via the daisy-chain communication link.

Example 14 provides a system according to one or more of the preceding and/or following examples, wherein wherein the daisy-chain communication link is an RS485 communication link.

Example 15 provides a system according to one or more of the preceding and/or following examples, wherein the energy harvester is an inductive energy harvester.

Example 16 provides a system according to one or more of the preceding and/or following examples, further comprising an inductive exciter module configured to emit inductive energy, and wherein the energy harvester receives the emitted inductive energy and converts the received emitted inductive energy to charge to power the base module and the plurality of edge modules.

Example 17 provides a system according to one or more of the preceding and/or following examples, wherein each of the structural integrity sensors of the plurality of structural integrity sensors is configured to sense at least one of cracking, corrosion, and strain.

Example 18 provides a method for witness integrity sensing, comprising: emitting an inductive signal from a hotspot transceiver; receiving the inductive signal at an antenna; converting the inductive signal to charge at an energy harvesting module; providing the charge to a base module; powering, from the base module, respective sensing elements of a plurality of sensing elements, wherein each sensing element of the plurality of sensing elements is connected to a respective edge module of a plurality of edge modules, and wherein the plurality of edge modules are connected to the base module via a daisy-chain configuration; and collecting sensed data from each of the plurality of sensing elements via a communication link.

Example 19 provides a method according to one or more of the preceding and/or following examples, wherein powering respective sensing elements comprises powering a selected element of the plurality of sensing elements, wherein the selected sensing element is in an active operational mode, a first subset of the plurality of sensing elements between the base module and the selected sensing element are in a powered-down operational mode, and a second subset of the plurality of sensing elements between the selected sensing element and an end of the daisy-chain are in a not-powered operational mode.

Example 20 provides a method according to one or more of the preceding and/or following examples, wherein collecting sensed data from each of the plurality of sensing elements comprises collecting data from a selected element of the plurality of sensing elements, wherein the selected sensing element is in an active operational mode, a first subset of the plurality of sensing elements between the base module and the selected sensing element are in a powered-down operational mode, and a second subset of the plurality of sensing elements between the selected sensing element and an end of the daisy-chain are in a not-powered mode.

Example 21 provides a system for wireless integrity sensing including a first module having a processor and a first communication link, a plurality of second modules each coupled to a sensing element, wherein each of the second modules includes a sensor signal conditioning element for receiving sensor data and an ADC for converting sensor data to a digital data signal, and an i2C communication link connecting the first module and each of the plurality of second modules, wherein each of the second modules transmits a respective digital data signal to the first module.

Example 22 provides a system according to to one or more of the preceding and/or following examples, wherein the processor in the first module performs cluster-based edge-integrity analytics on the respective digital data signals received from the plurality of second modules.

Example 23 provides a system for wireless integrity sensing including first and second distributed modules, wherein the first module includes is an external module that includes an energy harvester and a wireless communication data link to power and collect the sensor network status information, and the second module is a sensor signal conditioning electronics module which is mounted on the sensing element.

Example 24 provides a wireless integrity sensing system for collecting structural integrity information from multiple sensors within an enclosed space, comprising a first module including an energy harvester and a wireless communication data link, and a plurality of second modules each including a sensing element and signal conditioning electronics.

Example 25 provides a system according to one or more of the preceding and/or following examples, wherein the first module is coupled to the plurality of first modules via a wired communication link.

Example 26 provides a system according to one or more of the preceding and/or following examples, wherein the communication link between the first module and the plurality of second modules is an I2C line.

Example 27 provides a system according to one or more of the preceding and/or following examples, wherein the first module provides power to the plurality of second modules via the communication link.

Example 28 provides a system according to one or more of the preceding and/or following examples, wherein the plurality of second modules provides sensed data to the first module via the communication link.

Example 29 provides a system according to one or more of the preceding and/or following examples, wherein the plurality of second modules are positioned within an enclosed space.

Example 30 provides a system according to one or more of the preceding and/or following examples, wherein one or more sensing element sense cracks and/or corrosion.

Example 31 provides a system according to one or more of the preceding and/or following examples, wherein the energy harvester uses a first RF ISM band and the wireless communication data link is uses a second RF ISM band.

Example 32 provides a wireless integrity sensing system including a plurality of sensors, a plurality of signal conditioning electronics modules each connected to a respective sensor, and a central data acquisition module coupled to the plurality of signal conditioning electronics modules, wherein the central data acquisition module includes a line of sight energy harvester and a wireless communication data link, wherein the energy harvester converts a received radiofrequency signal to charge to power the central data acquisition module and the plurality of signal conditioning electronics modules, and wherein the wireless communication data link transmits sensor data received at the central data acquisition module.

Example 33 provides a wireless integrity sensing system comprising a first module having a processor, and a plurality of second modules each coupled to a sensing element, wherein the first module is coupled to the plurality of second modules with an I2C connection, wherein the first module receives sensor data from the plurality of second modules via the I2C connection, and wherein the first module includes a HUMS bus interface for receiving power and for transmitting the sensor data.

Example 34 provides a system according to one or more of the preceding examples, wherein each of the sensing elements is a structural integrity sensor.

Example 35 provides a system according to one or more of the preceding examples, wherein each of the sensing elements is configured to sense at least one of cracking, corrosion, and strain.

Example 36 may include one or more non-transitory computer-readable media comprising instructions that, upon execution of the instructions by a processor of a computing device, are to cause the computing device to perform functions of wired or wireless communication or power transfer related to any of examples 1-15, or some other example herein.

Example 37 provides a system and/or method according to one or more of the preceding examples, wherein a powered-down operational mode is a sleep mode.

Example 38 provides a system and/or method according to one or more of the preceding examples, wherein in a not-powered operational mode, an element receives no power.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Figures, or the claims.

What is claimed is:

1. A system for wireless integrity sensing, comprising:
a base module having a processor;
a plurality of structural integrity sensing elements;
an energy harvester configured to receive energy and provide power to the base module, wherein the base module is configured to selectively power respective structural integrity sensing elements of the plurality of sensing elements;
a plurality of edge modules, wherein each of the plurality of edge modules is coupled to a respective structural integrity sensing element of the plurality of structural integrity sensing elements; and
a daisy-chain communication link connecting the base module to each of the plurality of edge modules in series, wherein each of the plurality of edge modules transmits a respective data signal to the base module, and wherein the daisy-chain communication link ends at a network terminator.

2. The system of claim 1, wherein each edge module of the plurality of edge modules is in one of an active operational mode, a not-powered operational mode, and a powered down operational mode.

3. The system of claim 1, wherein when the base module powers a selected structural integrity sensing element of the plurality of structural integrity sensing elements along the daisy-chain, the selected structural integrity sensing element is in an active operational mode, a first subset of the plurality of structural integrity sensing elements between the base module and the selected structural integrity sensing element are in a powered-down mode, and a second subset of the plurality of structural integrity sensing elements between the selected structural integrity sensing element and an end of the daisy-chain are in a not-powered mode.

4. The system of claim 1, wherein the communication link is an RS485 communication link.

5. The system of claim 1, wherein the daisy-chain ends at a network terminator.

6. The system of claim 1, wherein the base module is configured to provide power to each of the plurality of edge modules via the communication link.

7. The system of claim 6, wherein the base module is configured to provide power to one of the plurality of edge modules at a time.

8. The system of claim 1, wherein each of the plurality of edge modules comprises:
a sensor signal conditioning element configured to receive sensor data from a respective structural integrity sensing element of the plurality of structural integrity sensing elements; and
an analog-to-digital converter configured to convert sensor data to a digital data signal.

9. The system of claim 8, wherein the communication link is an I2C communication link.

10. The system of claim 1, wherein the base module provides power to respective edge modules of the plurality of edge modules via the daisy-chain communication link.

11. A system for wireless integrity sensing for collecting structural integrity information from multiple sensors within an enclosed space, comprising:
a base module including a processor and an energy harvester;
a plurality of structural integrity sensors; and
a plurality of edge modules each coupled to a respective structural integrity sensor from the plurality of structural integrity sensors; and
a daisy-chain communication link connecting the base module to each of the plurality of edge modules in series, wherein the communication link ends at a network terminator;
wherein the base module provides power to respective edge modules of the plurality of edge modules via the daisy-chain communication link.

12. The system of claim 11, wherein respective edge modules of the plurality of edge modules provide sensor data to the base module via the daisy-chain communication link.

13. The system of claim 11, wherein the daisy-chain communication link is an RS485 communication link.

14. The system of claim 11, wherein the energy harvester is an inductive energy harvester.

15. The system of claim 14, further comprising an inductive exciter module configured to emit inductive energy, and wherein the energy harvester receives the emitted inductive energy and converts the received emitted inductive energy to charge to power the base module and the plurality of edge modules.

16. The system of claim 11, wherein each of the structural integrity sensors of the plurality of structural integrity sensors is configured to sense at least one of cracking, corrosion, and strain.

17. A method for witness integrity sensing, comprising:
emitting an inductive signal from a hotspot transceiver;
receiving the inductive signal at an antenna;
converting the inductive signal to charge at an energy harvesting module;
providing the charge to a base module;
powering, from the base module, respective sensing elements of a plurality of sensing elements, wherein each sensing element of the plurality of sensing elements is connected to a respective edge module of a plurality of edge modules, and wherein the plurality of edge modules are connected to the base module via a daisy-chain configuration; and
collecting sensed data from each of the plurality of sensing elements via a communication link,
wherein powering respective sensing elements comprises powering a selected element of the plurality of sensing elements, wherein the selected sensing element is in an active operational mode, a first subset of the plurality of sensing elements between the base module and the selected sensing element are in a powered-down operational mode, and a second subset of the plurality of sensing elements between the selected sensing element and an end of the daisy-chain are in a not-powered operational mode.

18. The method of claim 17, wherein collecting sensed data from each of the plurality of sensing elements comprises collecting data from a selected element of the plurality of sensing elements, wherein the selected sensing element is in an active operational mode, a first subset of the plurality of sensing elements between the base module and the selected sensing element are in a powered-down operational mode, and a second subset of the plurality of sensing elements between the selected sensing element and an end of the daisy-chain are in a not-powered operational mode.

* * * * *